US005858457A

United States Patent [19]
Brinker et al.

[11] Patent Number: 5,858,457
[45] Date of Patent: Jan. 12, 1999

[54] PROCESS TO FORM MESOSTRUCTURED FILMS

[75] Inventors: C. Jeffrey Brinker, Albuquerque, N. Mex.; Mark T. Anderson, Woodbury, Minn.; Rahul Ganguli, Camarillo, Calif.; Yunfeng Lu, Albuquerque, N. Mex.

[73] Assignee: Sandia Corporation, Albuquerque, N. Mex.

[21] Appl. No.: 937,407

[22] Filed: Sep. 25, 1997

[51] Int. Cl.[6] ........................................................ B05D 5/06
[52] U.S. Cl. ........................ 427/162; 427/299; 427/372.2; 427/430.1
[58] Field of Search ................................... 427/162, 299, 427/272.2, 430.1

[56] References Cited

U.S. PATENT DOCUMENTS

| | | | |
|---|---|---|---|
| 5,057,296 | 10/1991 | Beck | 423/277 |
| 5,098,684 | 3/1992 | Kresge et al. | 423/277 |

OTHER PUBLICATIONS

C. T. Kresge, M. E. Leonowicz, W. J. Roth, J. C. Vartuli & J. S. Beck, *Ordered Mesoporous Molecular Sieves Synthesized by a Liquid–Crystal Template Mechanism*, Nature, vol. 359, Oct. 22, 1992.

Jeffrey S. Beck and James C. Vartuli, *Recent Advances in the Synthesis, Characterization and Applications of Mesoporous Molecular Sieves*, Curr, Opinion in Solid State and Material Science, 1996, 1: 76–87., (No month avail.)

J. S. Beck, J. C. Vartuli, W. J. Roth, M. E. Leonowicz, C.T. Kresge, K. D. Schmitt, C. T.–W Chu, D. H. Olson, E. W. Sheppard, S. B. McCullen, J. B. Higgins, and J. L. Schlenker, *A New Family of Mesoporous Molecular Sieves Prepared with Liquid Crystal Templates*, J. Am. Chem. Soc., 1992, 114:10835., (No month avail.)

Qisheng Huo, David I. Margolese, Ulrike Ciesla, Dirk G. Demuth, Pingyun Feng, Thurman E. Gier, Peter Sieger, Ali Firouzi, Bradley F. Chmelka, Ferdi Schüth, and Galen D. Stucky, *Organization of Organic Molecules with Inorganic Molecular Species into Nanocomposite Biphase Arrays*, Chem. Mater. 1994, 6: 1176–1191., (No month avail.)

A. Firouzi, D. Kumar, L. M. Bull, T. Besier, P. Sieger, Q. Huo, S. A. Walker, J. A. Zasadzinski, C. Glinka, J. Nicol, D. Margolese, G. D. Stucky, B. F. Chmelka, *Cooperative Organization of Inorganic–Surfactant and Biomimetic Assemblies*, Science vol. 267, Feb.24, 1995, pp. 1138–1143.

Peter T. Taney and Thomas J. Pinnavaia, *A Neutral Templating Route to Mesoporous Molecular Sieves*, Science, vol. 267, Feb. 10, 1995, pp. 865–867.

Stephen A. Bagshaw, Eric Prouzet, and Thomas J. Pinnavaia, *Templating of Mesoporous Molecular Sieves by Nonionic Polyetheylene Oxide Surfactants*, Science, vol. 269, Sep. 1, 1995, pp. 1243–1244.

Peter T. Tanev and Thomas J. Pinnavaia, *Mesoporous Silica Molecular Sieves Prepared by Ionic and neutral Surfactant Templating: A Comparison of Physical Properties*, Chem. Mater. 1996, vol. 8, 2068–2079., (No month avail.)

(List continued on next page.)

*Primary Examiner*—Bernard Pianalto
*Attorney, Agent, or Firm*—Elmer A. Klavetter

[57] ABSTRACT

This invention comprises a method to form a family of supported films film with pore size in the approximate range 0.8–20 nm exhibiting highly ordered microstructures and porosity derived from an ordered micellar or liquid-crystalline organic-inorganic precursor structure that forms during film deposition. Optically transparent, 100–500-nm thick films exhibiting a unique range of microstructures and uni-modal pore sizes are formed in seconds in a continuous coating operation. Applications of these films include sensors, membranes, low dielectric constant interlayers, anti-reflective coatings, and optical hosts.

15 Claims, 12 Drawing Sheets

OTHER PUBLICATIONS

David M. Antonelli and Jackie Y. Ying, *Synthesis of a Stable Hexagonally Packed Mesoporous Niobium Oxide Molecular Sieve Through a Novel Ligand–Assisted Templating Mechanism,* Angew, Chem. Int. Ed., Engl., 1996, vol. 35, No. 4, pp. 426–430., (No month avail.)

David M. Antonelli and Jackie Y. Ying, *Synthesis and Characterization of Hexagonally Packed Mosoporous Tantalum Oxide Molecular Sieves,* Chem. Mater. 199, vol. 8, pp. 874–881., (No date avail.)

Ulrike Ciesla, Stefhan Schacht, Glen D. Stucky, Klaus K. Unger, and Ferdi Schüth, *Formation of a Porous Zirconium Oxo Phosphate with a High Surface Area by a Surfactant–Assisted Synthesis,* Angew. Chem. Int. Ed. Engl. 1996, 35, No. 5, pp. 541–543., (No month avail.)

Sandra L. Burkett, Stephen D. Sims, and Stephen Mann, *Synthesis of Hybrid Inorganic–Organic Mesoporous Silica by Co–Condensations of Siloxane and Organosiloxane Precursors,* Chem. Commun., 1996, pp. 1367–1368., (No month avail.)

K. R. Kloetstra, J. C. Jansen, and H. Van Bekkum, *Composite Molecular Sieve Comprising MCM–41 with Intraporous ZSM–5 Structures,* Symposium on Advances in FCC Conversion Catalysts Presented before the Division of Petroleum Chemistry, Inc. 211th National Meeting. American Chemical Society, New Orleans, LA, Mar. 24–29, 1996.

Hong Yang, Neil Coombs, Igor Sokolov, and Geoffrey A. Ozin, *Free–standing and Oriented Mesoporous Silica Films Grown at the Air–Water Interface,* Nature, vol. 381, Jun. 13, 1996. pp. 589–592.

PROCESS TO FORM MESOSTRUCTURED FILMS

This invention was made with Government support under Contract No. DE-AC04-94AL85000 awarded by the Department of Energy. The Government has certain rights in the invention.

BACKGROUND OF THE INVENTION

The invention relates to a method to form a family of supported films exhibiting highly ordered microstructures and porosity derived from an ordered micellar or liquid-crystalline organic-inorganic precursor structure that forms during film deposition. Applications of these films include sensors, membranes, low dielectric constant interlayers, anti-reflective coatings, and optical hosts.

The International Union of Pure and Applied Chemistry, IUPAC, classifies porosity on the basis of pore diameter, $d_p$. Mesoporous materials are defined by IUPAC as those materials in which 2 nm$<d_p<$50 nm, although many other definitions abound in the literature. In keeping with prior art on this subject, we will define the mesoporous range as 0.8 nm$<d_p<$20 nm.

Mesoporous inorganic materials comprise inorganic xerogels (e.g., the common silica desiccants), pillared clays, and the subject matter of this patent viz. mesoporous molecular sieves (MMS), recently discovered by researchers at Mobil (U.S. Pat. No. 5,098,684, issued to Kresge et al. On Mar. 24, 1992; U.S. Pat. No. 5,057,296 issued to J. S. Beck on Oct. 15, 1991) and referred to in the literature as the MCM (Mobil composition of matter) family of materials. MMS prepared generally as powders have received enormous attention by the research community since their announcement by Kresge et al. (Kresge C. T., Leonowicz M. E., Roth W. J., Vartuli J. C., Beck J. S., Nature, 1992, 359: 710–712). In the past two years, advances have been made in understanding and exploiting the supramolecular templating process used in MMS formation, development of new synthetic procedures, extending the compositional range beyond silicas, and processing of MMS as thin films. MMS are high surface area amorphous solids (surface area up to 1400 m$^2$/g) characterized by monosized cylindrical pores, ranging from about 12–100 Å in diameter, organized into periodic arrays that often mimic the liquid crystalline phases exhibited by surfactants. MMS synthesis procedures typically require four reagents: water, surfactant, a soluble inorganic precursor, and catalyst. MMS form (as precipitates) in seconds to days (Beck J. S., Vartuli J. C., Roth W. J., Leonowicz M. E. Kresge C. T., Schmitt K. D., Chu C. T. W., Olson D. H., Sheppard E. W., McCullen S. B. et al., J. Am. Chem. Soc., 1992, 114: 10835; Huo Q., Margolese D. L., Ciesla U., Demuth D. G., Feng P., Gier T. E., Sieger P., Firouzi A., Chmelka B. F., Schüth F., Stucky G. D., Chem. Mater., 1994, 6: 1176–1191) at temperatures ranging from 180° C. to as low as −14° C., depending on the inorganic precursor. Before pyrolysis or surfactant extraction, pure silica MMS exhibit three structure types: (1) hexagonal (referred to as H or MCM-41), a 1-d system of hexagonally ordered cylindrical silica channels encasing cylindrical surfactant micellar assemblies; (2) cubic (C), a 3-d, bicontinuous system of silica and surfactant; and (3) lamellar, a 2-d system of silica sheets interleaved by surfactant bilayers.

Over the past several years various MMS synthetic pathways have been elucidated (Beck J. S., Vartuli J. C., Curr. Opinion in Solid State and Material Science, 1996, 1: 76–87). Experimentally, it has been shown that MCM-41 type phases form under conditions in which the surfactant—before the addition of the silica source—is: a) free (surfactant concentration, c, is less than the critical micelle concentration for spherical micelles, $c<c_{mc1}$), b) in the form of spherical micelles ($c_{mc1}<c<c_{mc2}$, where $c_{mc2}$ is the critical micelle concentration for cylindrical micelles), and c) in the form of cylindrical micelles ($c_{mc2}<c<c_{LC}$, where $c_{LC}$, is the concentration for formation of the liquid crystalline (LC) phase), or d) in the form of liquid crystalline phases. These findings indicate that silica does not in general simply petrify a pre-existing LC array but rather cooperatively co-assembles with the surfactant to form LC phases during the course of the synthesis. Specific details of the co-assembly mechanism are still controversial. Three models have been postulated: a puckering layered model, silicate rod assembly, and cooperative charge density matching. Regardless of the specifics, it has been shown that silica condensation is not essential to the assembly process. Using anionic cubic octamers $Si_8O_{20}^{8-}$, Firouzi et al. (Firouzi A., Kumar D., Bull L. M., Besier T., Sieger P., Huo, Q., Walker, S. A., Zasadzinski J. A., Glinka C., Nicol J., Margolese D., Stucky G. D., Chmelka B. F., Science, 1995, 267 1138–1143) demonstrated reversible lamellar to hexagonal phase transformations. Nor are electrostatic interactions essential. Tanev and Pinnavaia (Tanev P. T., Pinnavaia T. J., Science, 1995, 267: 865–867) and Bagshaw et al. (Bagshaw A. S., Prouzet E., Pinnavaia T. J., Science, 1995, 269: 1242–1244) have demonstrated the formation of MMS using two neutral routes based on hydrogen bonding and self-assembly between nonionic primary amine or polyethylene oxide surfactants and neutral oligomeric silica precursors. Tanev and Pinnavaia (Tanev P. T., Pinnavaia T. J., Chem. Mater., 1996, 8: 2068–2079) compared ionic and neutral surfactant-templated MMS and concluded that, although the ionic surfactant-templated MMS have in general greater order, the neutral surfactant templated MMS has thicker walls, a greater extent of condensation, improved thermal stability, and greater textural mesoporosity. In addition, the combination of a neutral framework and extensive condensation permit template removal by solvent extraction.

In the past several years, there has been synthesized multicomponent and non-silica MMS (Huo Q., Margolese D. L., Ciesla U., Demuth D. G., Feng P., Gier T. E., Sieger P., Firouzi A., Chmelka B. F., Schüth F., Stucky G. D., Chem. Mater., 1994, 6: 1176–1191) for catalytic applications due to their higher surface areas and greater accessibility of active sites compared to zeolites. Particular attention has been paid to titanium incorporation in silica MMS based on expectations that, by analogy to the ability of TS-1 (Ti-doped high silica ZSM-5) to selectively oxidize alkanes, alkenes, and alcohols, titania-silica MMS (Ti-MMS) may perform shape selective oxidation of larger organic molecules. Ti-MMS have been synthesized by incorporation of titanium into the silica framework or by grafting titanocene complexes on pre-formed silica MMS, the latter procedure providing higher surface concentrations and accessibility of catalytic sites. Oxidation studies have confirmed the ability of Ti-MMS to perform large molecule oxidation. For example, selective epoxidation of norborene using tertbutylhydroperoxide as an oxidant could be achieved with Ti-MMS but not TS-1 due to the bulky nature of the reactants. Additionally, shape selective conversion of 2,6-di-tert-butyl phenol has been demonstrated along with enhanced activity when Ti is grafted as a pendant site on the pore interior. However, when comparing oxidation reactions of small molecules such as the epoxidation of hexene by $H_2O_2$, TS-1 exhibits much higher activity than Ti-MMS, and reactions that occur readily with TS-1, such as primary amine oxidation, practically do not occur over Ti-MMS. The reasons for these differences in reactivity are presently unclear but altered framework crystallinity, hydrophilicity, and Ti redox potential may be contributing factors.

With regard to non-silica frameworks and hybrid structures, several recent reports are noteworthy. Antonelli and Ying (Antonelli D. M., Ying J. Y., Angew. Chem. Int. Ed. Engl., 1996, 35: 426–430; Antonelli D. M., Ying J. Y., Chem. Mater., 1996, 8: 874–881) developed a ligand-assisted templating scheme to prepare pure niobium and tantalum oxide MMS that were stable to surfactant removal and hydrothermally stable to temperatures ranging from 300°–800° C. Neutral primary amine surfactants were pre-reacted with metal alkoxides to form new metal organic surfactant molecules which were hydrolyzed in a second step to produce pure Nb or Ta MMS. The surfactant was removed by acid washes that cleaved the metal-nitrogen bond. Ciesla et al. (Ciesla U., Schacht S., Stucky G. D., Unger K. K., Schüth F., Angew Chem Int. Ed. Engl., 1996, 35: 541–543) developed phosphate and sulfate complexation schemes to stabilize zirconium oxide MMS. Phosphate and sulfate ions assisted in the formation of zirconia-surfactant composites and promoted further crosslinking of the zirconium oxo species, stabilizing the porous structure to 500° C. Using tetraalkoxysilane and substituted organoalkoxysilane precursors, Burkett et al. (Burkett S. L., Sims S. D., Mann S., Chem. Comm. 1996, 1367–1368) prepared hybrid inorganic-organic MMS containing covalent Si-phenyl and Si-n-octyl bonds. Kloetstra et al. (Kloetstra K. R., Jansen J. C., van Bekkum H., Proc. of Symp. on Advances in FCC Conversion Catalysts, 211th National Meeting, Div Petrol Chem, Am Chem Soc Nat Mtg, New Orleans, La. Mar. 24–29, 1996) hydrothermally treated calcined, aluminosilicate MMS with tetrapropylammonium hydroxide and formed Al—Si MMS containing zeolitic ZSM-5 micro-domains. These composite materials were shown to be active for hexane cracking under conditions where commercial aluminosilicate catalysts and the parent Al—Si MMS were not.

Films exhibiting a unimodal pore size are frequently cited as a promising application of mesoporous materials, and very recently Yang et al. (Yang H., Coombs N., Sokolov I., Ozin G. A., Nature, 1996, 381: 589–592) showed that by exceeding the critical micelle concentration $c_{mc}$ of a bulk silica-surfactant solution, hexagonal liquid crystalline silica mesophases formed at solid-liquid and liquid-vapor interfaces. It was proposed that the growth process involved self-assembly of silica-surfactant micellar species on interfacially organized structures. However this process is relatively slow, e.g. ~0.2–1.0-$\mu$m thick films were grown over a period of 1 h -1 week at 80° C., and results in opaque, granular films that appear inhomogeneous on the several-$\mu$m length scale. None of these previous studies have demonstrated accessibility of the mesophase porosity of a supported film.

SUMMARY OF THE INVENTION

The present invention relates to the preparation of an ordered micellar or liquid-crystalline organic-inorganic precursor structure as a supported thin film and its conversion to an ordered, inorganic porous film with pore size in the approximate range 0.8–20 nm by removal of the organic constituents. The precursor films formed by this process are characterized by x-ray or electron diffraction patterns consistent with hexagonal, cubic, or lamellar symmetries with characteristic d-spacings, $d_{100}$, greater than about 1 nm. After pyrolysis, the hexagonal and cubic diffraction patterns are retained with shifted peak positions due to shrinkage of the framework, whereas the lamellar structure collapses to form a relatively dense amorphous phase. The pyrolyzed films exhibit typically high surface areas (~1000 $m^2/g$), moderate porosities (typically, 40–60%), and uni-modal pore size distributions. Potential applications of the films are in the areas of environmental sensors, catalysis, low dielectric constant interlayers, molecular separations, and anti-reflective coatings.

DESCRIPTION OF SPECIFIC EMBODIMENTS

In contrast to the previous approaches to prepare films described above, our process begins with a homogeneous solution with initial surfactant concentration $c_o$<<$c_{mc}$ (critical micelle concentration). We rely on surfactant enrichment by solvent evaporation to exceed $C_{mc}$ only within the depositing film allowing us to access a continuous range of silica/surfactant/solvent phase space. Whereas self-assembly in bulk solution has resulted so far only in hexagonal mesophases, by varying $c_o$ (while maintaining $c_o<<c_{mc}$) we can continuously vary the final film structure, providing the first evidence for an interfacially-organized cubic phase. Optically transparent, 100–500-nm thick films exhibiting a unique range of microstructures and uni-modal pore sizes are formed in seconds in a continuous coating operation.

The general procedure to prepare precursor sols used for coating was the addition of a cationic surfactant (CTAB $CH_3(CH_2)_{15}N(CH_3)_3Br$) to a silica sol prepared by a two-step acid-catalyzed process (A2**). In the first step, TEOS ($Si(OC_2H_5)_4$), ethanol, water and HCl were refluxed at 60° C. in the following mole ratios: $1:3.8:1:5\times10^{-5}$. In the second step, performed at room temperature, additional water was added and the HCl concentration was increased to ~0.01M, corresponding to the minimum average siloxane condensation rate. Following stirring for 15 minutes at 25° C., the sols were aged at 50° C. for periods of 0–8 h and diluted with 2 equivalents of ethanol. CTAB was added in varying quantities corresponding to concentrations $c_o$ ranging from 0.03 to 0.11M (1–5 wt %). The final reactant mole ratios $TEOS:EtOH:H_2O:HCl:CTAB$ were: 1:22:5:0.004:0.093–0.31. Spectroscopic studies showed that for all these precursor sols the initial surfactant concentration $c_o$ was below the critical micelle concentration.

Figure 1:
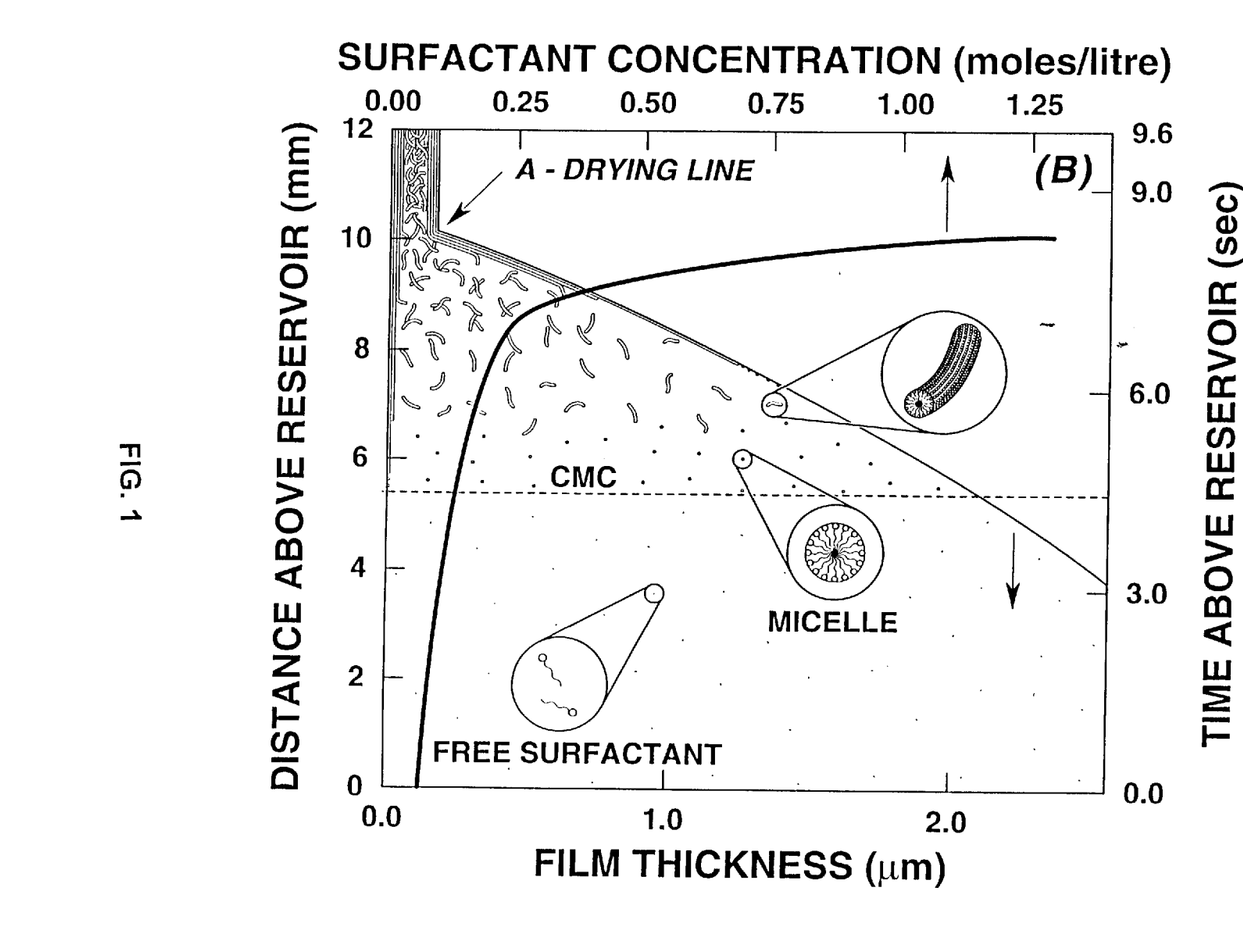
FIG. 1 shows an experimentally measured film thickness profile obtained during dip-coating showing both the film thickness and surfactant concentrations as a function of distance above the sol reservoir surface.

Thin films were prepared on ~0.6-cm wide strips of polished, (100) silicon by dip-coating at rates ranging from 7.6–50.9 cm/min or by spin-coating. During dip-coating the substrate is immersed in the precursor sol and withdrawn at a constant rate (see FIG. 1). The precursor sol is entrained on the substrate surface in a layer several micrometers thick and transported vertically at a rate commensurate with the coating rate. The entrained sol experiences preferential evaporation of ethanol, progressively enriching the concentrations of water and the non-volatile constituents, silica, surfactant, and HCl. As the surfactant concentration is increased above $c_{mc}$, silica-surfactant supramolecular assemblies develop within the thinning film. Continued drying solidifies the film, freezing-in a particular film microstructure that depends on the initial surfactant concentration $c_o$ along with other factors as summarized in the specific examples given below.

During spin-coating, the film thins by centrifugal draining accompanied by preferential evaporation. Enrichment of water, silica, surfactant, and acid similarly result in the formation of silica-surfactant supramolecular assemblies.

Typically ordered porous films were prepared from the as-deposited films by oxidative pyrolysis of the supramolecular surfactant templates at 400° C., although other methods, such as solvent extraction, could be employed for this purpose.

An important part of the invention is that the initial surfactant concentration is less than the critical micelle concentration, allowing accessibility to a continuous range of silica/surfactant/solvent phase space and allowing control of the final film structure. This control allows preparation of interfacially-organized cubic phase as well as lamellar and hexagonal structures. Additionally, the pore size can be controlled, as shown in the Examples, to approximately 1 nm or less to larger pore sizes up to 20 nm. The surfactant can be cationic, anionic, or nonionic. The surfactant used in the Examples, CTAB, is cationic. Other cationic surfactants that can be used include alkyammonium salts, gemini surfactants, cetylethylpiperidinium salts, and dialkyldim-ethylammonium. Anionic surfactants that can be used include sulfates, sulfonates, phosphates, and carboxylic acids. Nonionic surfactants, with the hydrophilic group not charged, include primary amines, poly(oxyethylene oxides), octaethylene glycol monodecyl ether and octaethylene glycol monohexadecyl ether.

Although silica sols are discussed primarily here, other metal oxides can be used in the preparation of these thin films, as discussed in the Background of the Invention. In particular, along with silicon, titanium, zirconium, aluminum, and combinations thereof, can be used in the preparation of these thin films.

EXAMPLES

EXAMPLE 1

Effect of initial surfactant concentration $c_o$

Silica sols were prepared by a two-step process: in the first step, TEOS ($Si(OC_2H_5)_4$), ethanol, water and HCl were refluxed at 60° C. in the following mole ratios: $1:3.8:1:5\times10^{-5}$. The sol was cooled to room temperature, additional water was added, and the HCl concentration was increased to ~0.01 M. Following stirring for 15 minutes at 25° C., the sols were diluted with 2 equivalents of ethanol. CTAB was added in varying quantities corresponding to concentrations $c_o$ ranging from 0.03 to 0.11M (1–5 wt %) resulting in a series of precursor sols. The final reactant mole ratios $TEOS:EtOH:H_2O:HCl:CTAB$ were: 1:22:5:0.004:0.093–0.31.

Figure 2A:
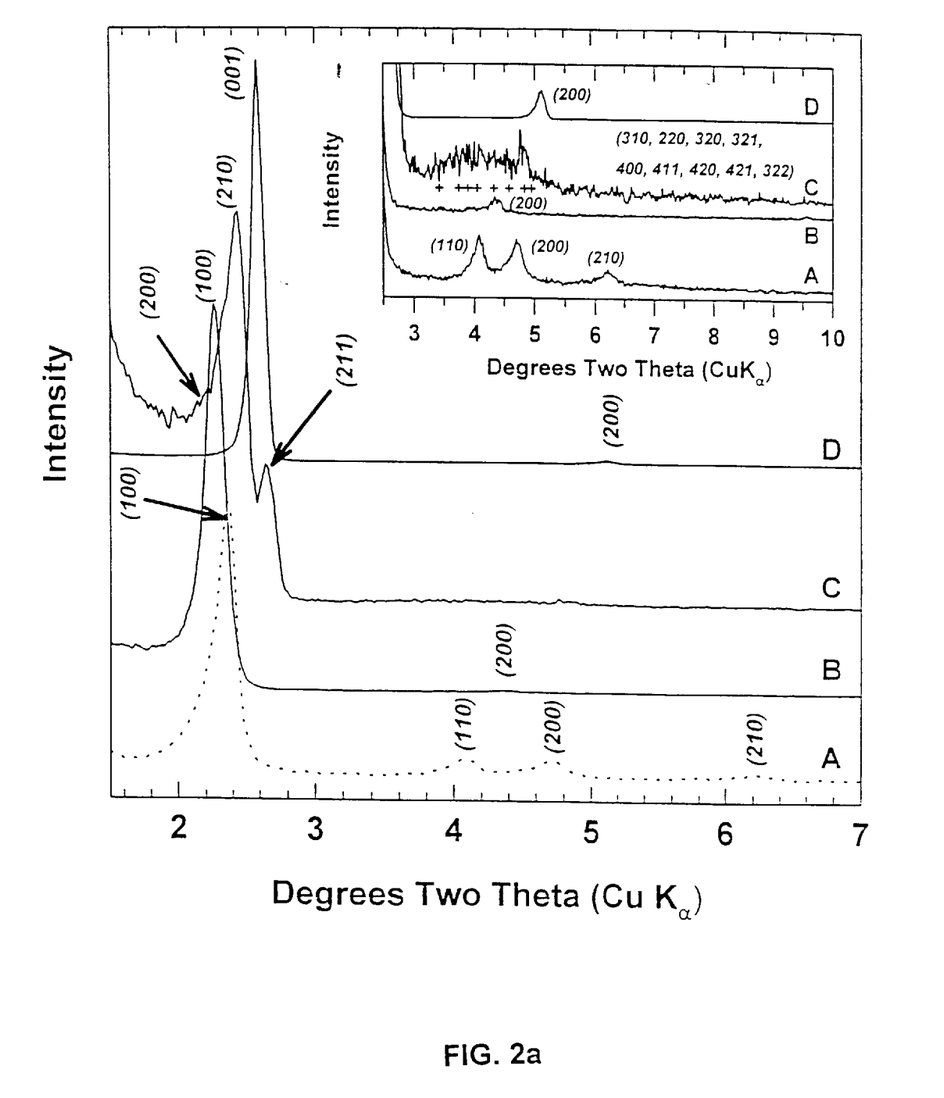
FIG. 2a shows X-ray diffraction (XRD) patterns prior to calcination.

Films were deposited on silicon wafers using a dipping speed of 50.8 cm/minute. Films were pyrolyzed in oxygen at 400° C. for four hours, using heating and cooling rates of 1° C./min. FIG. 2a shows the X-ray diffraction (XRD) patterns of several 'as-deposited' films prepared with $c_o$ ranging from 0.06 to 0.11M. Shown for comparison is the XRD of an MCM-41-type ordered silica mesophase. The XRD patterns were recorded on a Siemens D500 diffractometer using Ni-filtered CuKa radiation with I=1.5418 Å in θ–2θ scan mode. Trace A, powdered, bulk mesoporous silica sample synthesized with $TMOS:H_2O:EtOH:NaOH:CTAB$= 1:103.2:10.1:0.130:0.289 (i.e. 2.0 wt % CTAB), showing four Bragg reflections. Traces B-D, a series of uncalcined films prepared with differing surfactant concentrations, B: $c_o$=0.06M (2.5 wt % CTAB), C: $c_o$=0.08M (3.5 wt % CTAB), D: $c_o$=0.11M (5.0 wt % CTAB). Inset: Region 2θ=3°–10° with an intensity scale expanded 32 times. Plus symbols (+) in Trace C inset denote the positions of the weaker reflections (310, 220, etc.) calculated for a Pn3m structure with a =81.7 Å.

Figure 2B:
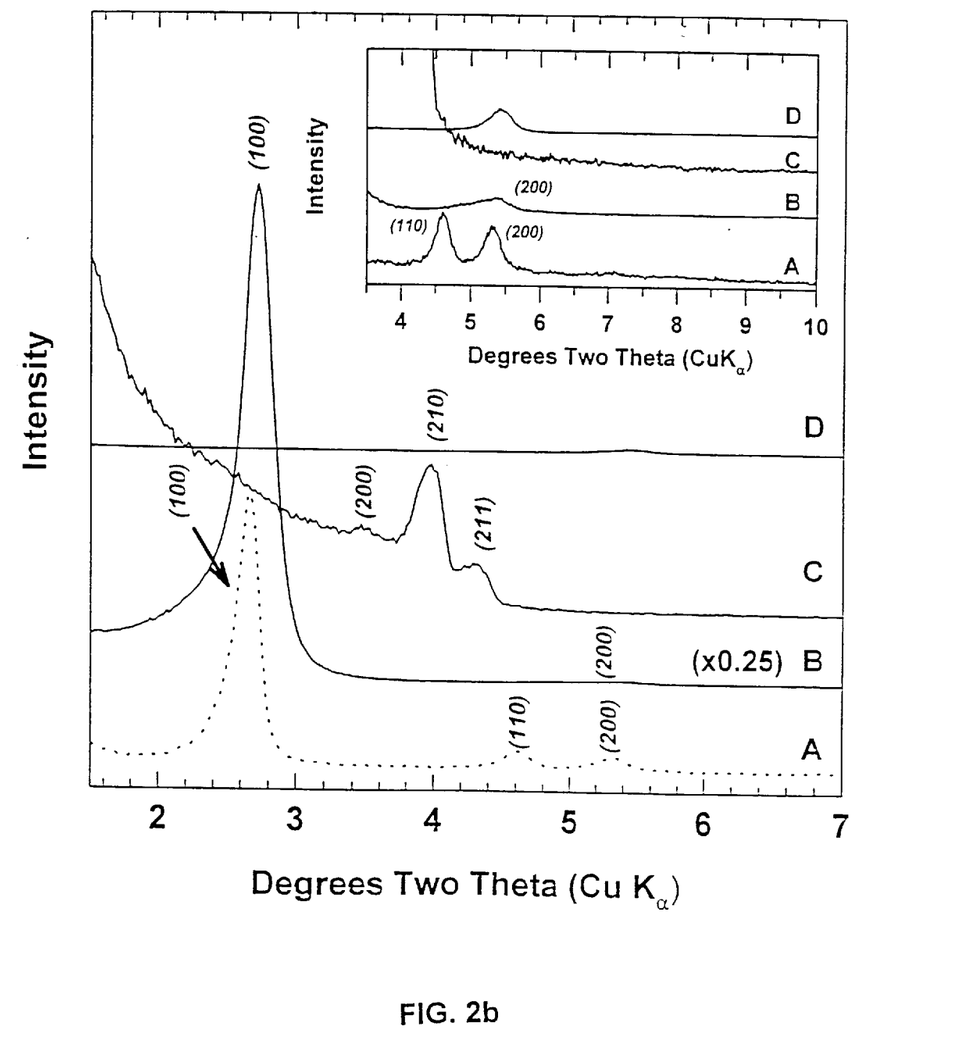
FIG. 2b shows XRD patterns of after calcination at 400° C.

FIG. 2b shows the XRD patterns of the corresponding samples after calcination at 400° C. (Inset: Region 2θ=2.5°–10° with an intensity scale expanded 20 times). These data show that increasing the surfactant concentration in the precursor solution causes a progressive change in the mesophase structure 'frozen-in' by film solidification at the drying line paralleling that of simple water-surfactant systems viz. amorphous (XRD not shown), hexagonal, cubic, lamellar. Trace A is indicative of a randomly oriented MCM-41-like phase that is stable to calcination. Trace B is indicative of a well-ordered hexagonally packed phase with a unit cell constant a =45.8 Å (uncalcined) and a =37.8 Å (calcined), in which the axes of the pore channels are oriented parallel to the substrate surface (note the absence of mixed reflections (110) and (210)). Trace C is indicative of a Pm3n cubic phase with a unit cell constant a =81.7±0.2 Å

(uncalcined) and a =50.5±0.5 Å (calcined). Trace D is consistent with a lamellar phase with basal spacing c=34.6 Å. The lamellar phase collapses upon calcination, leaving only a tiny residual peak (0.5% of the intensity of the (001) peak of the uncalcined film) indicative of a small fraction of a non-collapsed, porous phase with d=16 Å.

To our knowledge, this is the first report of a film exhibiting cubic liquid crystalline order. Substantiating evidence for the presence of a cubic phase may be summarized as follows: 1) The XRD patterns of the uncalcined and calcined film (traces C in FIGS. 2a and b) can both be indexed to a Pn3m cubic cell with small standard deviation (81.7±0.2 Å, uncalcined, and 50.5±0.5 Å, calcined). 2) The relative intensities of the peaks are qualitatively consistent with those for bulk cubic materials. 3) The XRD of the calcined film clearly shows three low angle peaks (200, 210, 211) characteristic of a Pn3m phase (the 200 peak is not well-resolved in the uncalcined film), and upon calcination the major 210 and 211 peaks are both shifted commensurately, corresponding to a relative shrinkage of ~38%. 4) None of the primary peaks disappears upon calcination, ruling out the interpretation of the uncalcined trace as a combination of a hexagonal and lamellar phase. 5) There is a broad feature in the uncalcined trace that is consistent with the convolution of the less intense 310, 220, 320, 321, 400, 411, 420, 421, and 322 reflections.

Transmission electron microscopy (TEM) micrographs were taken of the calcined film prepared with an initial surfactant concentration of 0.06M, identical to sample B in FIG. 2b, showing that the film exhibits a unique, sandwich structure composed of ordered regions adjacent to the air-film and film-substrate interfaces and a dis-ordered interior region with textural features commensurate to the periodic interfacial structures. Both the TEM and XRD results are consistent with hexagonally close-packed pore channels oriented parallel to the substrate surface. Scanning electron microscopy (SEM) micrographs showed that in contrast to granular films prepared by self-assembly, films formed by our process are smooth and featureless on the 1–100-$\mu$m scale.

Figure 3:
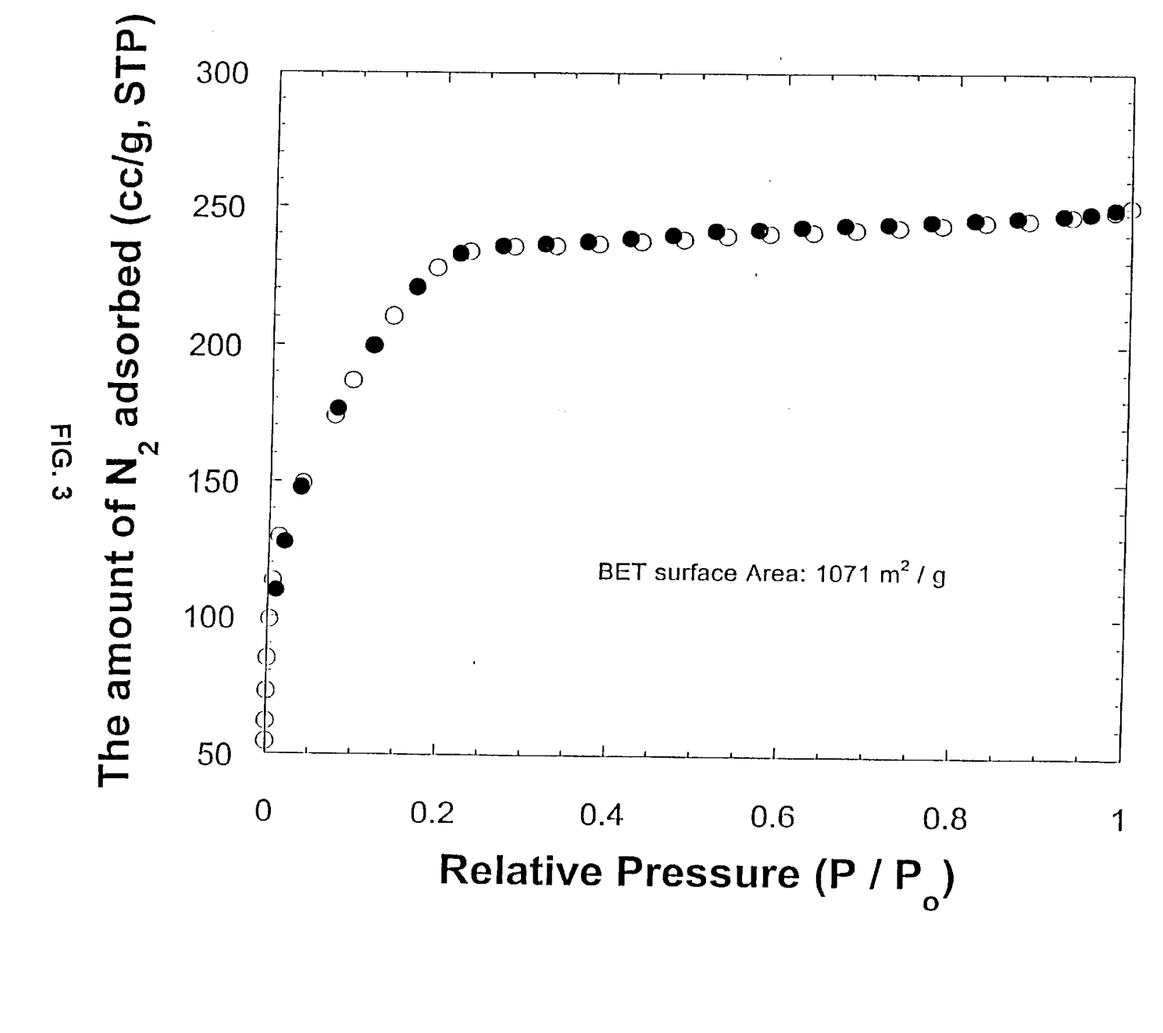
FIG. 3 shows an $N_2$ sorption isotherm obtained at 77K for a 400-nm thick film prepared with $c_o$=0.06M (adsorption, open circles, and desorption, filled circles).

FIG. 3 shows a SAW-based $N_2$ sorption isotherm of a calcined film prepared with an initial surfactant concentration of 0.06M. The isotherm was obtained at 77K for a 400-nm thick film prepared with $c_o$=0.06M (adsorption, open circles, and desorption, filled circles). The film was applied to an ~1 $cm^2$ area of a piezoelectric ST-cut quartz substrate with interdigital gold transducers designed to operate at 97 MHz. Mass change was monitored (~80 pg/$cm^2$ sensitivity) as a function of relative pressure using a surface acoustic wave technique. Mass change was converted to volume change (STP) assuming a $N_2$ density of 1.5468×10$^{-3}$ g/$cm^3$. The film mass was calculated from the film thickness and volume fraction porosity (derived from ellipsometric analyses), assuming a framework density of 2.1 g/$cm^3$. The isotherm acquired directly from a supported film without detachment from the substrate proves that, despite the substantial ordering of the pore channels parallel to the film surface, the porosity remains accessible to $N_2$ under these processing conditions. The lack of hysteresis and absence of any appreciable adsorption at relatives pressures above 0.3 is consistent with a uni-modal porosity with no interparticle meso- or macroporosity. The surface area calculated assuming a framework density of 2.1 g/$cm^3$ is 1071 $m^2$/g typical of that obtained from bulk hexagonal mesophases. The combined XRD and sorption data allows us to calculate a pore diameter of 1.8 nm and wall thickness of 1.9 nm.

EXAMPLE 2

Effect of the ambient relative humidity during film deposition and drying

Precursor sols were prepared as in Example 1 with 5.0 wt % CTAB. Films were deposited on single crystal silicon by dip-coating at 50.8 cm/min in a dry (nitrogen purged atmosphere) or under a series of different relative humidities (50, 60, 70, 80, or 90% RH). The deposited films were calcined as in Example 1. XRD indicated that, after pyrolysis, films prepared at 50 or 60% RH were amorphous, whereas the film prepared at 70% RH exhibited a weak shoulder at 2θ=4.3°. The film prepared at 80% RH showed a weak broad feature at 2θ=5.2°. The film prepared at 90% RH exhibited a strong, sharp peak at d=18 Å and a relatively weaker and broader peak at d~37 Å. The 70% RH film, as characterized by TEM micrographs, appears featureless and is representative of the microstructures of all the films prepared at RH<90%, whereas the film prepared at 90% RH exhibits straight, well-aligned channels.

This example clearly shows that the processing ambient has a profound effect on the microstructure, although the precise mechanism(s) involved have not been clearly elucidated. Our current view is that the films prepared with RH <90% are lamellar (as observed in Example 1 with 5.0% CTAB). Upon heating the lamellar structure collapses almost completely, resulting in dense, amorphous silica. High RH should suppress water evaporation, enriching the depositing sol slightly in water. This could cause us to access a different region of phase space. Alternatively water enrichment might promote condensation of the silica framework. This could favor the formation of hexagonal or cubic phases over lamellar or result in a lamellar to hexagonal phase transformation of the deposited film.

EXAMPLE 3

Effect of the silica sol aging time

Figure 4A:
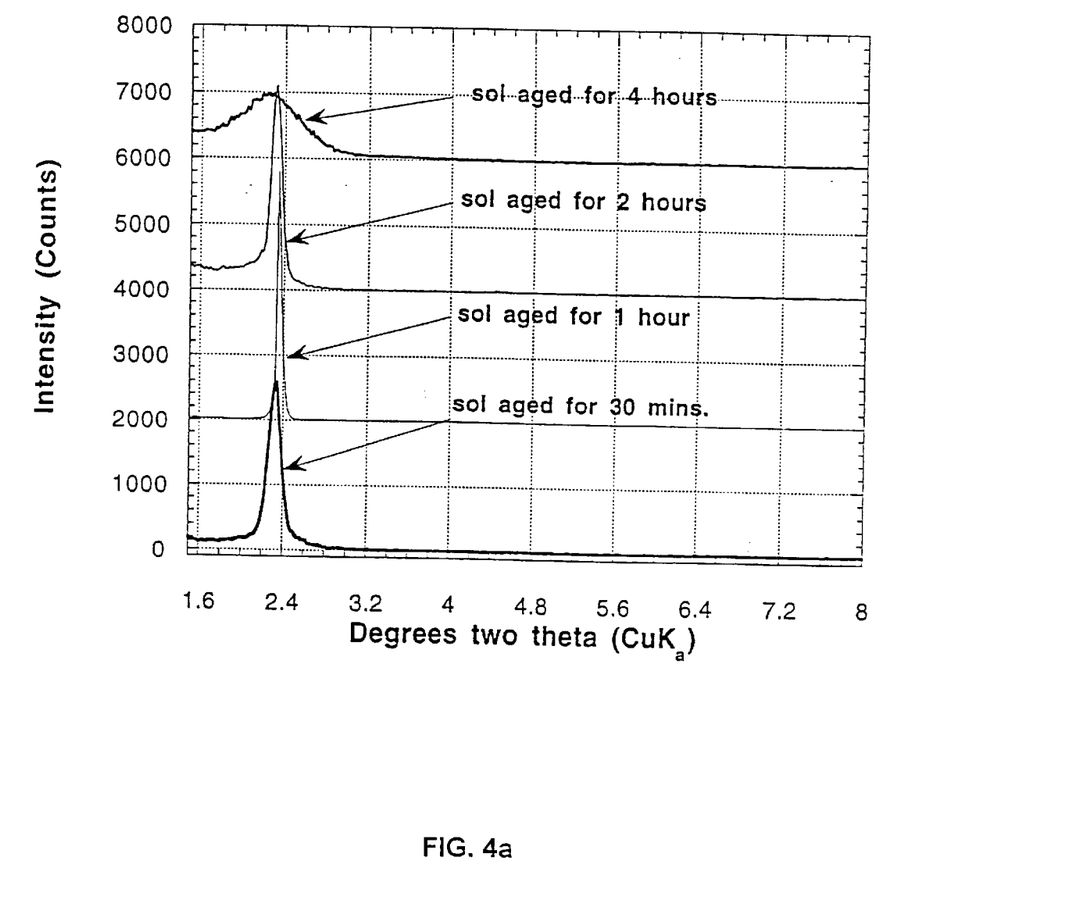
FIG. 4a shows an XRD of uncalcined films prepared from silica sols aged between 0 and 8 hours prior to surfactant addition (2.5 wt % CTAB) and dilution to yield precursor sols. Precursor sols were deposited on silicon substrates by dip-coating.
Figure 4B:
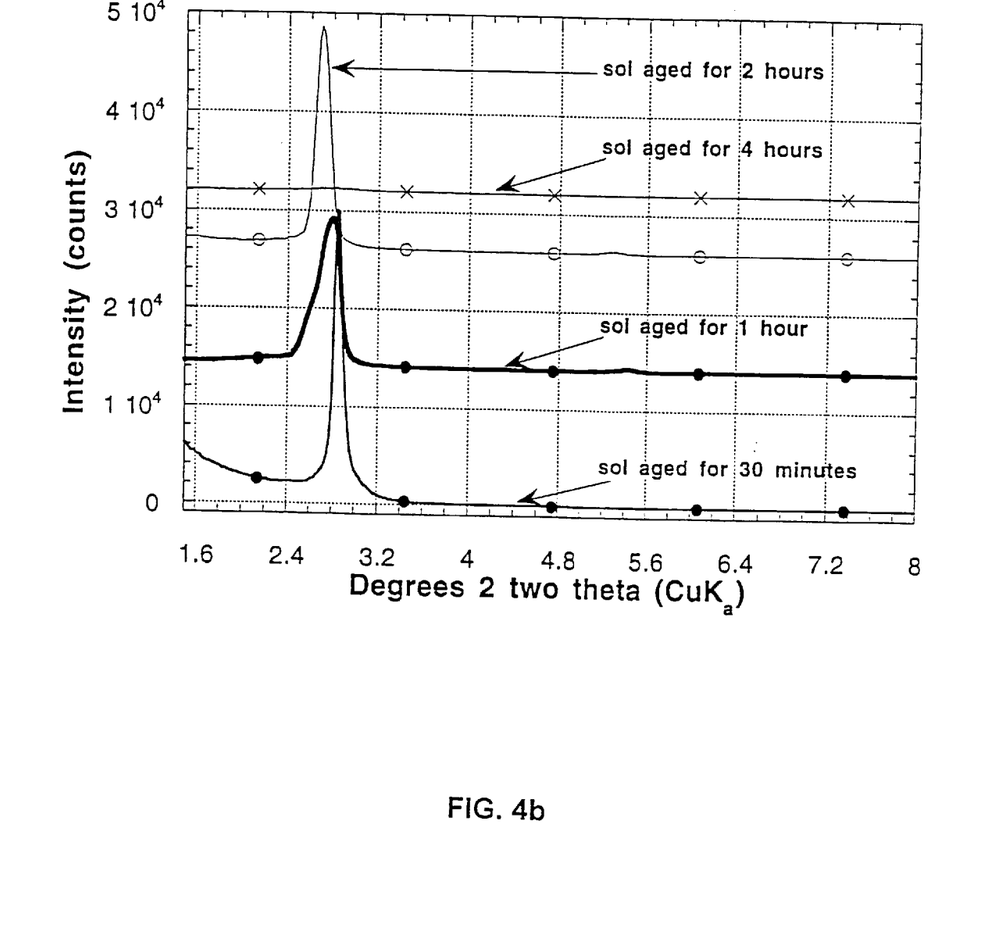
FIG. 4b shows an XRD of films as in FIG. 4a after calcination at 400° C.

A silica sol was prepared as in Example 1, but prior to dilution the sol was aged at 50° C. for periods of 0 min, 30 min, 1 hour, 2 hours, or 4 hours. The aged sols were cooled to room temperature and diluted with 2 equivalents of ethanol. CTAB was added in a quantity corresponding to 2.5 wt %, resulting in the precursor sols. Films were deposited on single crystal silicon substrates at a coating rate of 50.8 cm/min under approximately 50% RH conditions. FIGS. 4a and 4b show the XRD patterns before and after calcination at 400° C. (calcination conditions as in Example 1). Comparison of the full width at half maximum intensity (FWHM) of the sharp low angle peaks shows a distinct effect of aging on FWHM which is related to the extent of order of the liquid crystalline phase and corresponding pore morphology. A minimum in FWHM (corresponding to a maximum extent of order) is observed for the uncalcined film prepared from the 1 hour-aged sol and for the calcined film prepared from the 30 min-aged sol.

The effect of sol aging is to promote continued condensation and growth of the polysiloxane precursors. Apparently more extensive condensation resulting from long aging times impedes the co-organization of the silica-surfactant supramolecular assemblies, however it is clear that some finite extent of condensation is necessary to promote this co-organization. The fact that different sol aging times result in the minimum FWHM for calcined and uncalcined films may indicate that less highly condensed silica frameworks better accommodate the shrinkage of the structure upon calcination.

EXAMPLE 4
Creation of composite microstructures

Figure 5:
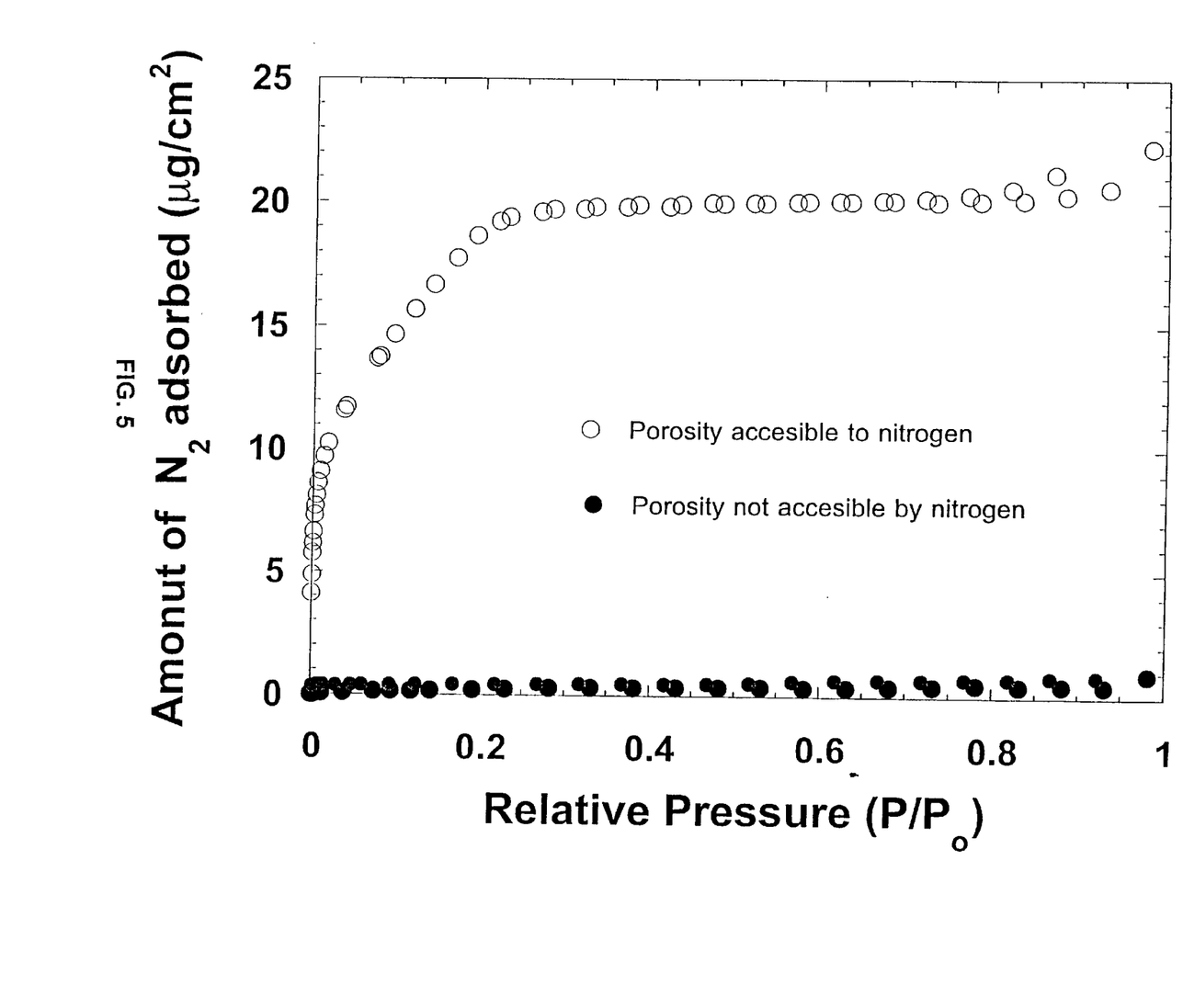
FIG. 5 shows a comparison of the $N_2$ isotherm of the film prepared from precursor sol containing 3.5 wt % CTAB by dip-coating at 15.2 cm/min (bottom filled set of points indicative of no accessibility to $N_2$ at −196° C. (temperature of $N_2$ sorption measurement)) with the $N_2$ isotherm of the film prepared as in FIG. 3 (top set of points indicative of accessible porosity).

A precursor sol was prepared according to Example 1 with 3.5 wt % CTAB. The sol was deposited on single crystal silicon substrates by dip-coating at 15.2 cm/min and calcined at 400° C. as in Example 1. As characterized by TEM micrographs, the calcined film is a composite microstructure composed of a porous silica interior sandwiched between dense amorphous silica layers at the substrate/film and film/vapor interfaces. FIG. 5 compares the $N_2$ adsorption-desorption isotherm of this film with that of the 2.5 wt % CTAB film prepared in Example 1. The dense surface layer accounts for the negligible uptake of $N_2$ in the 3.5 wt % CTAB sample.

Based on XRD, we believe that under these synthesis and deposition conditions, we form a lamellar skin at the substrate/film and film/vapor interfaces with a disordered worm-like micellar interior region. Upon heating the lamellar phase collapses, resulting in dense skin layers.

Figure 6:
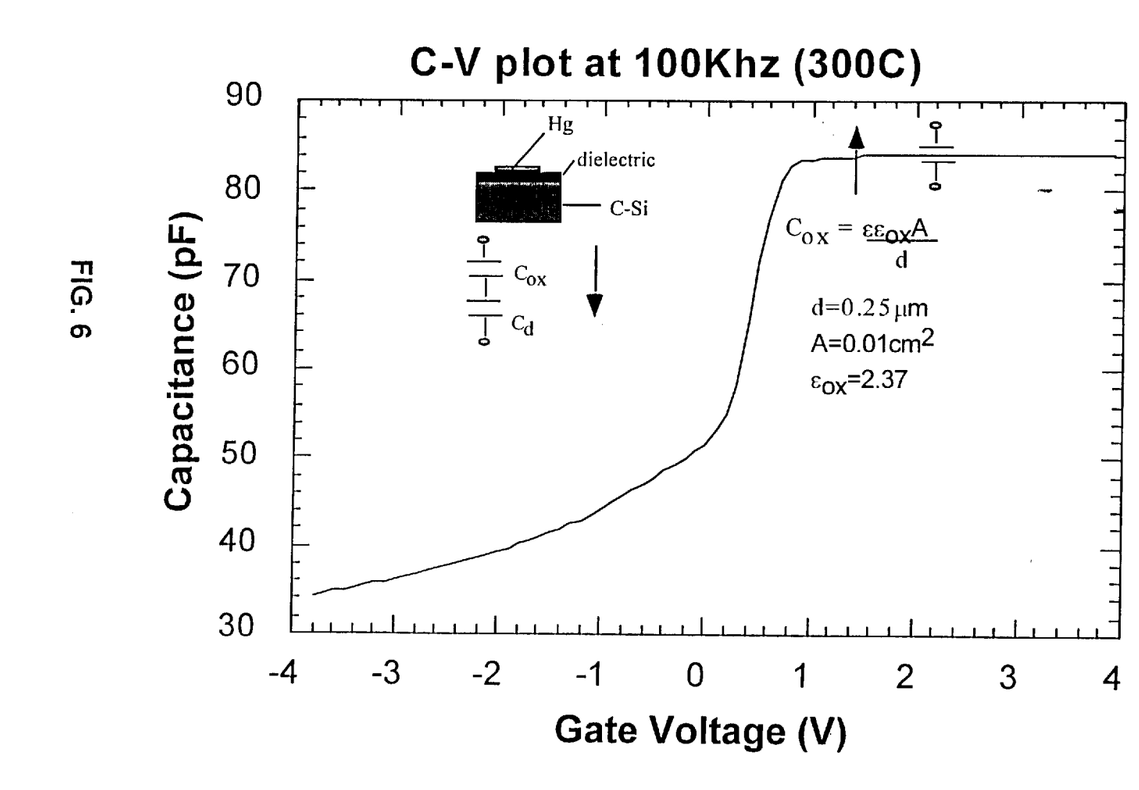
FIG. 6 is a capacitance versus voltage plot for 2.5 wt % CTAB film after calcination at 400° C. The dielectric constant was calculated to be 2.37.

EXAMPLE 5
Evaluation of the dielectric constant 2.5 wt % CTAB films were deposited on single crystal silicon substrates and calcined to 400° C. as in Example 1. After calcination the films were 250-nm thick as determined by profilometry. Capacitance-voltage measurements were performed at 100 KHz using a 1 $mm^2$ Hg dot electrode (see FIG. 6). The capacitance was determined to be 79 pF, corresponding to a film dielectric constant of 2.37.

Figure 7A:
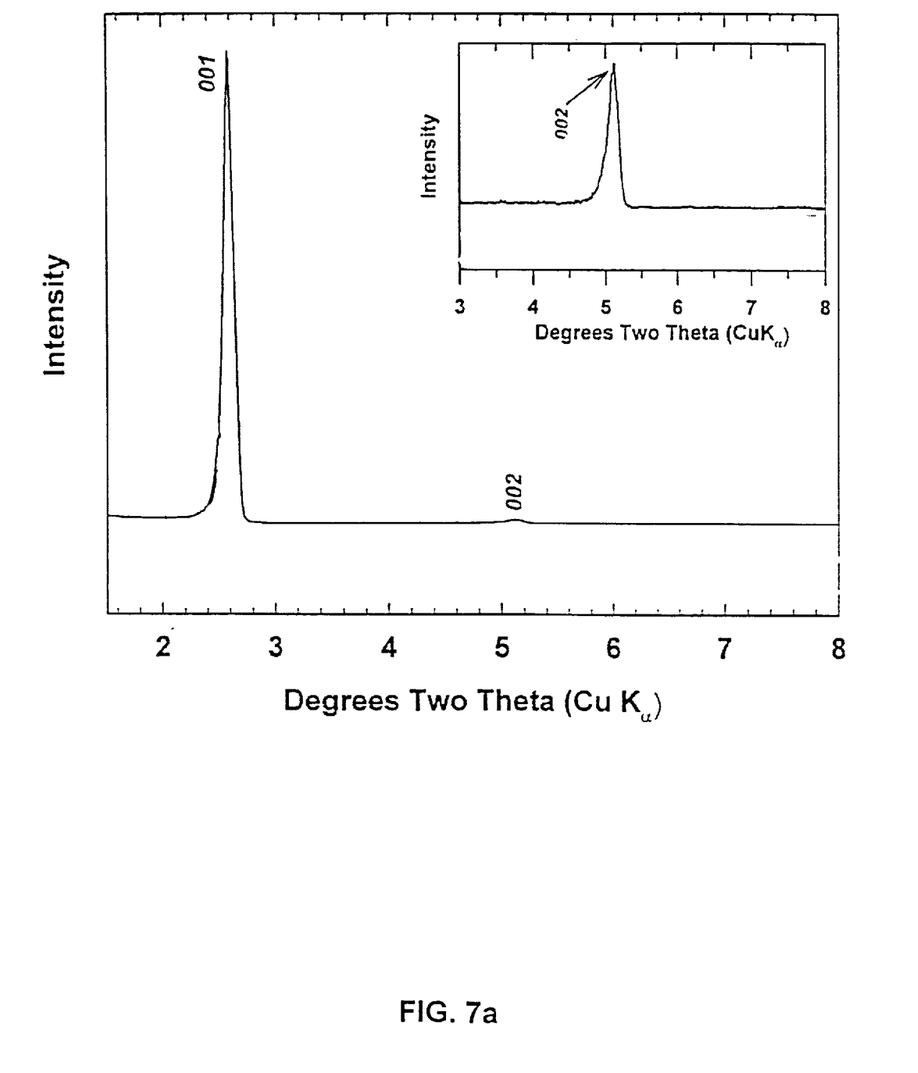
FIG. 7a shows an XRD of film prepared from 4.2 wt % CTAB sol by dip-coating at 50.8 cm/min before calcination showing 100 and 200 peaks of a lamellar phase.
Figure 7B:
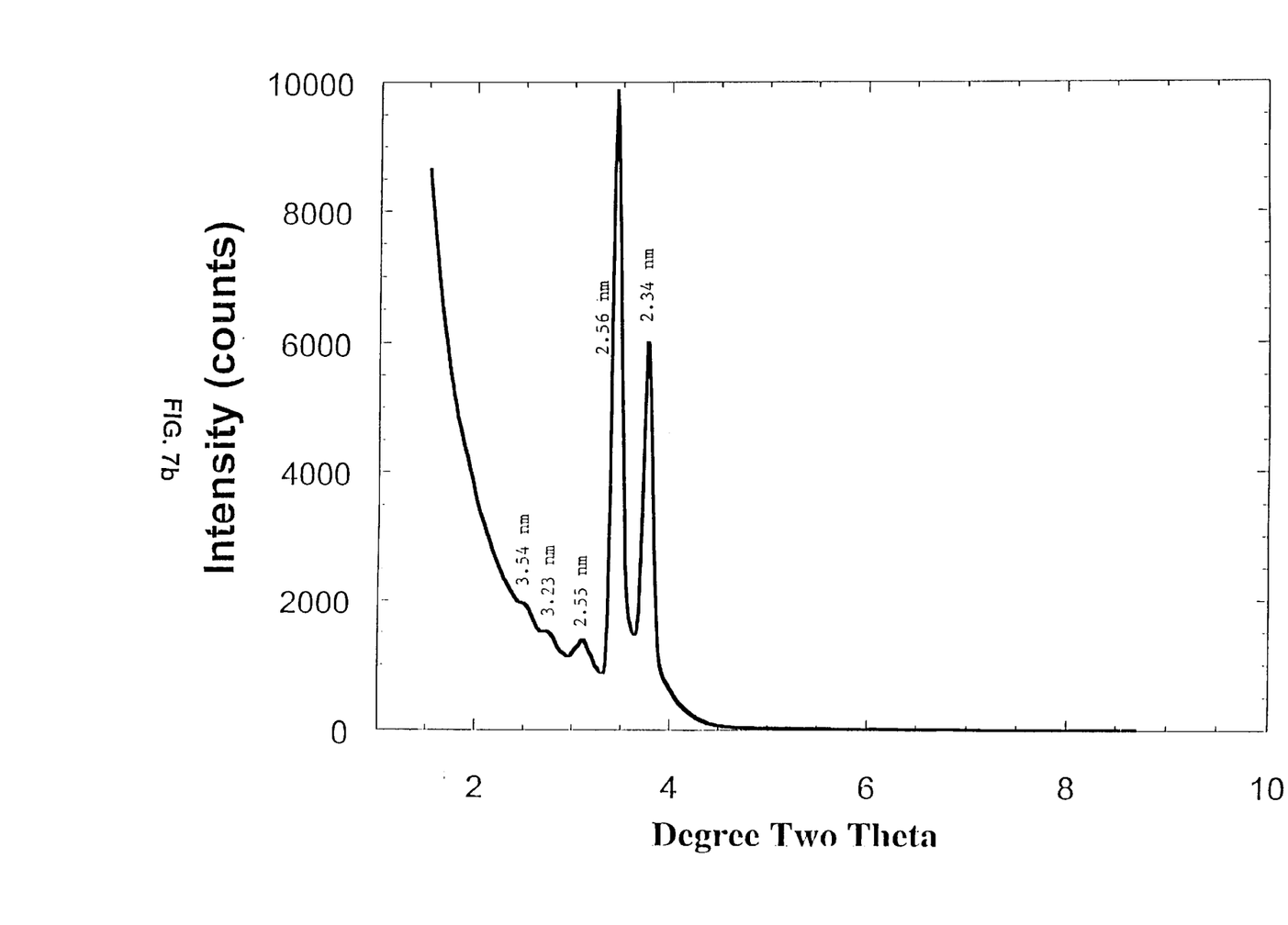
FIG. 7b shows an XRD of film prepared from 4.2 wt % CTAB sol by dip-coating at 50.8 cm/min after calcination showing XRD pattern of a cubic phase with cell dimension 8.1 nm.
Figure 7C:
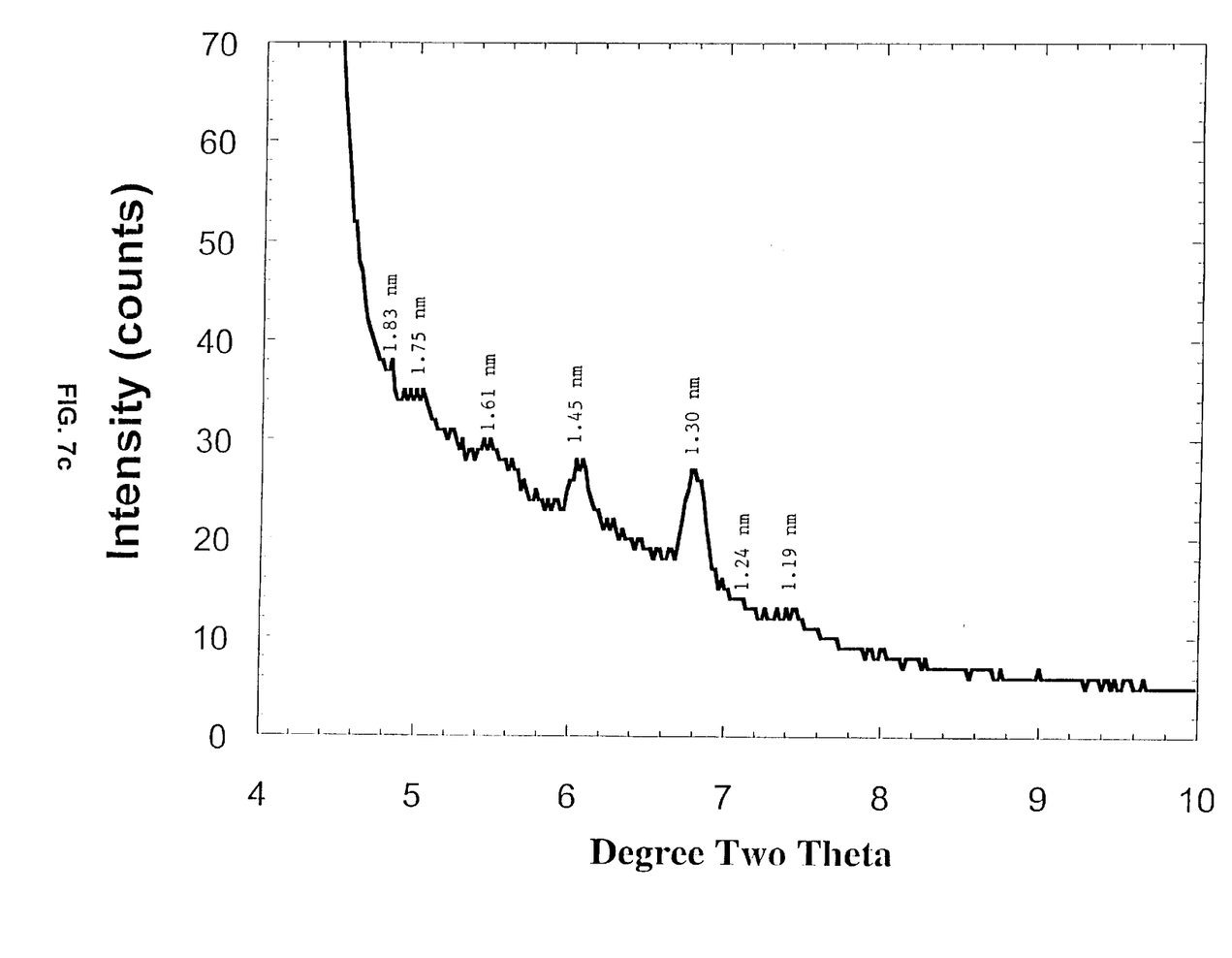
FIG. 7c shows a magnification of the XRD from FIG. 7b.

EXAMPLE 6
Creation of cubic films by a lamellar to cubic phase transition 4.2 wt % CTAB precursor sols prepared according to Example 1 were deposited on single crystal silicon substrates by dip-coating at 50.8 cm/min. XRD patterns were obtained before (FIG. 7a) and after (FIG. 7b 7c) calcination at 400° C. (performed as in Example 1). Comparison of FIGS. 7a, 7b, and 7c shows that the as-deposited lamellar film transforms during heating to a cubic film. As characterized by TEM micrographs, the calcined film is a completely uniform cubic phase throughout the film thickness. We also find that the lamellar film transforms to the cubic phase at room temperature over a period of several hours.

Our current view is that this transformation is induced by continuing condensation reactions of the silica framework that occur slowly at room temperature or more rapidly at elevated temperatures. As far as we know, lamellar to cubic phase transformations have not been reported to date for bulk or thin film specimens.

EXAMPLE 7
Creation of thick crack-free coatings

Precursor sols were prepared according to Example 1 with 5 wt % CTAB. Deposition of films on single crystal silicon substrates by dip-coating at 50.8 cm/min resulted in lamellar films. Upon heating these films are converted to dense amorphous silica coatings without cracking. Thick films can be deposited and densified using this approach, because the interleaved organic layers serve to mechanically decouple the inorganic layers during drying and heating. Thus the individual layers can shrink biaxially without developing macroscopic tensile stresses that could cause cracks if a critical film thickness were exceeded.

Stress development was measured during drying of precursor sols prepared according to Example 1 with 2.5, 3.5, and 5.0 wt % CTAB and spread on a flat plate by wetting. For all the films, tensile stresses of about 10 MPa were measured compared to 200 MPa for the same silica sol prepared without CTAB. This result indicates that the silica-surfactant supramolecular structure develops prior to the solidification of the silica framework, so there is essentially no shrinkage beyond the solidification point. Without CTAB a network develops and then shrinks due to the development of capillary drying stresses. In this case shrinkage beyond the solidification point creates biaxial tensile stress in the plane of the film.

These results indicate that our coating process is amenable to the preparation of relatively thick coatings on complex surfaces, for example low dielectric constant interlayers in microelectronics.

EXAMPLE 8
Effect of substrate pre-conditioning at different RH

Figure 8:
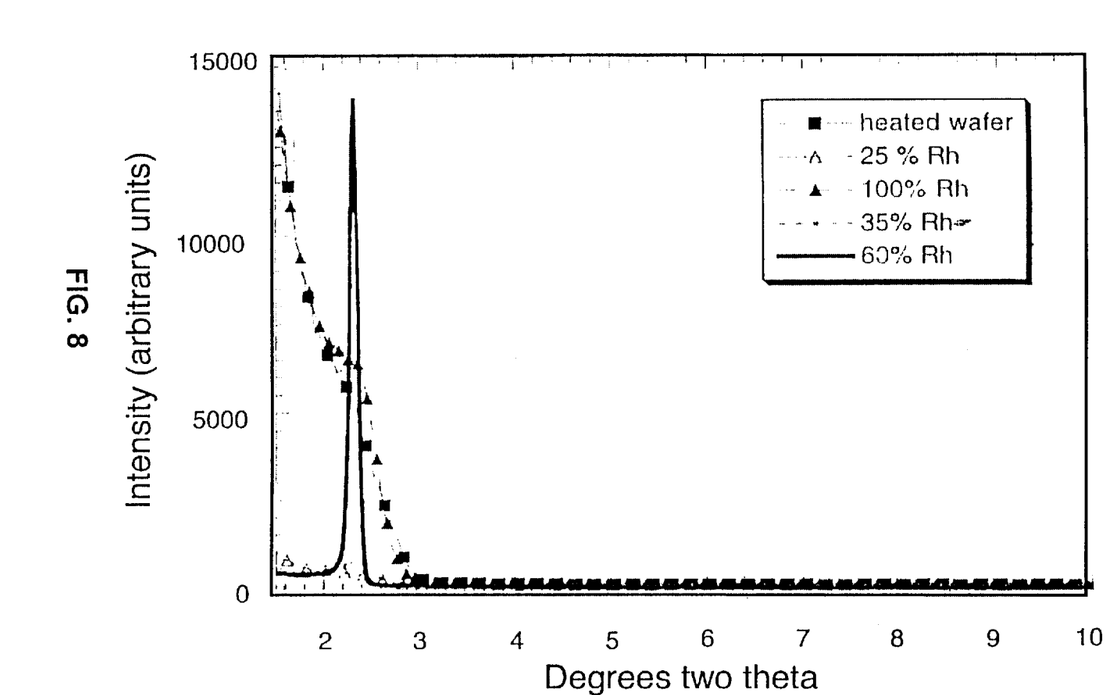
FIG. 8 shows an XRD of films prepared with 2.5 wt % CTAB by dip-coating at 50.8 cm/min. on single crystal (100) silicon substrates dried at 150° C. (0% RH sample) or pre-conditioned at 20–100% RH. The extent of liquid crystalline order as judged by the sharpness of the ~2.4° peak is maximized for pre-conditioning treatments conducted at 60% RH.

Precursor sols were prepared as in Example 1 with CTAB concentrations of 2.5% and aging times of approximately 30–60 minutes. Films were deposited on single crystal silicon substrates by dip-coating at 50.8 cm/min. Spin-coating or other standard coating techniques may also be used. Prior to film deposition the silicon substrates were pre-conditioned by drying at 150° C. or aging at room temperature under different relative humidities (20 to 100%) achieved by various acid/salt solutions. FIGS. 8a and 8b show XRD of the film samples before and after calcination at 400° C. We observe that the film order as judged by the intensity and FWHM of the $2\theta=2.4°$ peak depends strongly on the pre-conditioning RH, with the greatest order achieved at 60% RH.

In situ atomic force microscopy showed that structure development at the substrate/precursor sol interface depended on the pre-conditioning treatment. Using a precursor sol prepared with an initial CTAB concentration of 2.5 wt %, no supra-molecular silica surfactant structures were observed to form over a period of 1 hour on a dry single crystal silicon surface, whereas structures presumed to be hemi-micellar formed within several minutes on silicon pre-conditioned at 60% RH. We view the pre-conditioning treatment therefore as a means of influencing the nucleation of liquid crystalline structures at the substrate/ precursor sol interface during the film forming process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process to form mesostructured films, comprising:
   a) preparing a precursor sol containing a soluble source of a metal oxide, water, an organic solvent, surfactant, and acid or base catalyst, wherein the surfactant concentration $c_o$ is much less than the critical micelle concentration and the surfactant is present as free surfactant; and
   b) depositing the precursor sol on a substrate wherein evaporation of solvent and water causes the formation of said mesostructured films on the substrate surface wherein said mesostructured films are identified by XRD peaks in the range $2\theta=2°–6°$ hexagonal, cubic, or lamellar electron diffraction patterns.

2. The process of claim 1 wherein said film is used as a membrane, sensor, catalyst, low dielectric constant interlayer, or optical coating.

3. The process of claim 1 wherein said metal oxide is an oxide of silicon, aluminum, zirconium, titanium of combinations thereof.

4. The process of claim 1 wherein the sol is aged prior to film deposition to affect a change of the film microstructure.

5. The process of claim 1 wherein the sol is aged between 0 to approximately 4 hrs prior to film deposition.

6. The process of claim 1 wherein the surfactant is a cationic, anionic, or nonionic surfactant.

7. The process of claim 1 wherein the substrate is preconditioned at different relative humidities prior to film deposition to affect a change in the film microstructure.

8. The process of claim 7 wherein the relative humidity is between approximately 50 and 90 per cent.

9. The process of claim 1 further comprising the step of calcining said film at approximately 400° C.

10. The process of claim 9, wherein said film microstructure prior to calcination comprises liquid crystalline ordered structures at the film/substrate or film/vapor interfaces and a disordered micellar interior.

11. The process of claim 10, wherein the film/substrate or film/vapor interfaces exhibit lamellar structures prior to calcination and are converted to dense amorphous silica after calcination.

12. The process of claim 1 wherein the as-deposited film exhibits a lamellar structure that transforms to cubic after calcination at approximately 400° C. or after aging at approximately room temperature.

13. The process of claim 1 wherein said film exhibits a dielectric constant less than 3.0 after calcination at approximately 400° C.

14. The process of claim 1 wherein the precursor sol is deposited on a substrate by dip-coating or spin-coating.

15. A process to form mesostructured films, comprising:

(a) preparing a precursor sol by refluxing at approximately 60° C. TEOS ($Si(OC_2H_5)_4$), ethanol, water and HCl;

(b) adding water and HCl at approximately room temperature;

(c) aging said precursor sol at approximately 50° C. for periods of 0–8 h;

(d) adding surfactant wherein the initial surfactant concentration $c_o$ is below the critical micelle concentration; and a) depositing the precursor sol on a substrate wherein evaporation of solvent and water causes the formation of said mesostructured films on the substrate surface wherein said mesostructured films are identified by XRD peaks in the range $2\theta=2°-6°$ hexagonal, cubic, or lamellar electron diffraction patterns.

* * * * *